(12) United States Patent
Huang et al.

(10) Patent No.: US 9,983,727 B2
(45) Date of Patent: May 29, 2018

(54) ARRAY SUBSTRATE, METHOD FOR DRIVING THE ARRAY SUBSTRATE, DISPLAY PANEL AND DISPLAY DEVICE

(71) Applicants: Xiamen Tianma Micro-Electronics Co., Ltd, Xiamen (CN); Tianma Micro-Electronics Co., Ltd., Shenzhen (CN)

(72) Inventors: Min Huang, Xiamen (CN); Ying Sun, Xiamen (CN); Yumin Xu, Xiamen (CN); Chaohuang Pan, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 13 days.

(21) Appl. No.: 15/359,454

(22) Filed: Nov. 22, 2016

(65) Prior Publication Data
US 2017/0075487 A1    Mar. 16, 2017

(30) Foreign Application Priority Data
Jul. 29, 2016    (CN) .......................... 2016 1 0617004

(51) Int. Cl.
| | | |
|---|---|---|
| G06F 3/00 | (2006.01) | |
| G06F 3/041 | (2006.01) | |
| G06F 3/044 | (2006.01) | |
| G02F 1/1362 | (2006.01) | |
| G06F 1/32 | (2006.01) | |
| G02F 1/1333 | (2006.01) | |

(52) U.S. Cl.
CPC ...... *G06F 3/0416* (2013.01); *G02F 1/136286* (2013.01); *G06F 1/3262* (2013.01); *G06F 3/044* (2013.01); *G06F 3/0412* (2013.01); *G02F 1/13338* (2013.01)

(58) Field of Classification Search
CPC ....... G06F 3/0416; G06F 3/0412; G06F 3/044
See application file for complete search history.

(56) References Cited

U.S. PATENT DOCUMENTS

| | | | | |
|---|---|---|---|---|
| 2014/0192012 | A1* | 7/2014 | Kurasawa | ............... G06F 3/044 345/174 |
| 2015/0116263 | A1* | 4/2015 | Kim | ........................ G06F 3/044 345/174 |
| 2015/0370401 | A1* | 12/2015 | Mizuhashi | .......... G02F 1/13338 345/174 |
| 2016/0098126 | A1* | 4/2016 | Lee | ......................... G06F 3/044 345/174 |

* cited by examiner

*Primary Examiner* — Kevin M Nguyen
(74) *Attorney, Agent, or Firm* — Kilpatrick Townsend & Stockton LLP (57) ABSTRACT

An array substrate, a method are provided for driving the array substrate, a display panel, and a display device. The array substrate includes a plurality of data lines, a plurality of touch electrodes, and a touch driving circuit, wherein the plurality of data lines are divided into a plurality of data line groups, and each of the data line groups corresponds respectively to one of the respective touch electrodes; the touch driving circuit includes a common signal line, a first switch unit, and a second switch unit. The first switch unit and the second switch unit are electrically connected with the touch electrodes. When the data line groups are electrically connected with the touch electrodes, at least one data line in each of the data line groups is provided with a touch detecting signal.

19 Claims, 9 Drawing Sheets

ARRAY SUBSTRATE, METHOD FOR DRIVING THE ARRAY SUBSTRATE, DISPLAY PANEL AND DISPLAY DEVICE

CROSS-REFERENCE TO RELATED APPLICATIONS

This present application is related to and claims priority from Chinese Application No. 201610617004.3, filed on Jul. 29, 2016, entitled "ARRAY SUBSTRATE, METHOD FOR DRIVING THE ARRAY SUBSTRATE, DISPLAY PANEL AND DISPLAY DEVICE", the entire disclosure of which is hereby incorporated by reference.

TECHNICAL FIELD

This disclosure generally relates to the field of display technology, and in particular, to an array substrate, a method for driving the array substrate, a display panel and a display device.

BACKGROUND

Touch display screens are categorized into a self-capacitive touch display screen and a mutual-capacitive touch display screen dependent upon their touch principles. Typically in the existing mutual-capacitive touch display screen, mutual capacitors are formed between touch emitting electrodes and touch sensing electrodes, and a touch point is detected by measuring variations of the amounts of charges in the mutual capacitors while the touch display screen is being touched.

In the driving architecture of the mutual-capacitive touch display screen described above, a touch driving circuit needs to be designed to provide the touch emitting electrodes with a touch detection signal. Typically the touch driving circuit arranged in a non-display area separately from a driving chip can include a shifting module and a driving module, where the shifting module includes a plurality of levels of shifting units, where each level of shifting unit corresponds to one of the touch emitting electrodes, and each level of shifting unit shifts and then outputs a signal output by a preceding level of shifting unit. The circuit structure of the shifting module is complex in that each level of shifting unit includes a plurality of thin film transistor devices and a plurality of capacitors. The driving module is configured to be controlled by a signal output by a shifting circuit to provide the touch emitting electrodes with the touch detection signal above, and the circuit structure of the driving module includes a plurality of NAND gates, a plurality of inverters, and a plurality of thin film transistors. Accordingly there are a relatively large number of components in the existing touch driving circuit, with a complex circuit structure, and a relatively large occupied space, that may impede the design of the narrow edge frame.

SUMMARY

In view of the above-mentioned defects in the prior art, embodiments provide an array substrate, a method for driving the array substrate, a display panel, and a display device to address the technical problems mentioned in the Background section.

In order to attain the above objectives, in a first aspect, embodiments provide an array substrate, including a plurality of data lines, a plurality of touch electrodes, and a touch driving circuit, wherein the plurality of data lines are divided into a plurality of data line groups, each of the data line groups includes a plurality of data lines arranged in sequence, and each of the data line groups corresponds respectively to one of the respective touch electrodes. The touch driving circuit includes a common signal line, a first switch unit, and a second switch unit. The first switch unit and the second switch unit are electrically connected with the touch electrodes; the first switch unit is configured to electrically connect or disconnect the common signal line with or from the touch electrodes in response to the first control signal. The second switch unit is controlled by the second control signal to electrically connect or disconnect the respective data line groups with or from the corresponding touch electrodes. When the data line groups are electrically connected with the touch electrodes, at least one data line in each of the data line groups is provided with a touch detecting signal.

In a second aspect, embodiments provide a driving method for the above array substrate, wherein the first control signal includes a first ON signal and a first OFF signal, and the second control signal includes a second ON signal and a second OFF signal. In this aspect, the driving method can include an operating process of the array substrate that includes a display period and a touch detection period. The driving method can further include: during the display period, providing the first switch unit with the first ON signal to electrically connect the common signal line with the touch electrodes, providing the second switch unit with the second OFF signal to disconnect the data line groups from the touch electrodes, providing the common signal line with a common voltage signal, and providing the data lines with a data signal; and during the touch detection period, providing the first switch unit with the first OFF signal to disconnect the common signal line from the touch electrodes, providing the second switch unit with the second ON signal to electrically connect at least one data line in each data line group with its corresponding touch electrode, and providing the at least one data line with a touch detecting signal.

In a third aspect, embodiments provide a display panel, including the above mentioned array substrate, and a color film substrate arranged opposite to the above array substrate, wherein the touch electrodes are first touch electrodes, the color film substrate are provided thereon with second touch electrodes, and extending directions of the second touch electrodes are the same as that of the first touch electrodes.

In a fourth aspect, embodiments provide a display device, which includes the above display panel.

In the array substrate, the method for driving the array substrate, the display panel, and the display device provided by the embodiments, by grouping the data lines, electrically connecting the respective touch electrodes with the common signal line using the first switch unit, and electrically connecting the respective touch electrodes with at least one data line using the second switch unit, the number of elements in the touch driving circuit can be reduced, thereby reducing the occupied panel area of the touch driving circuit, and facilitating the design of the narrow edge frame.

DESCRIPTION OF EMBODIMENTS

The application will be described below in further details with reference to the drawings and the embodiments thereof. It should be appreciated that the specific embodiments described here are merely intended to illustrate, but not limit the invention. It should also be noted that only the components related to the invention are illustrated in the drawings for the ease of description.

It shall be noted that the embodiments of the application and the features of the embodiments can be combined with each other provided that they do not conflict with each other. The application will be described below in details with reference to the drawings and the embodiments thereof.

Figure 1:
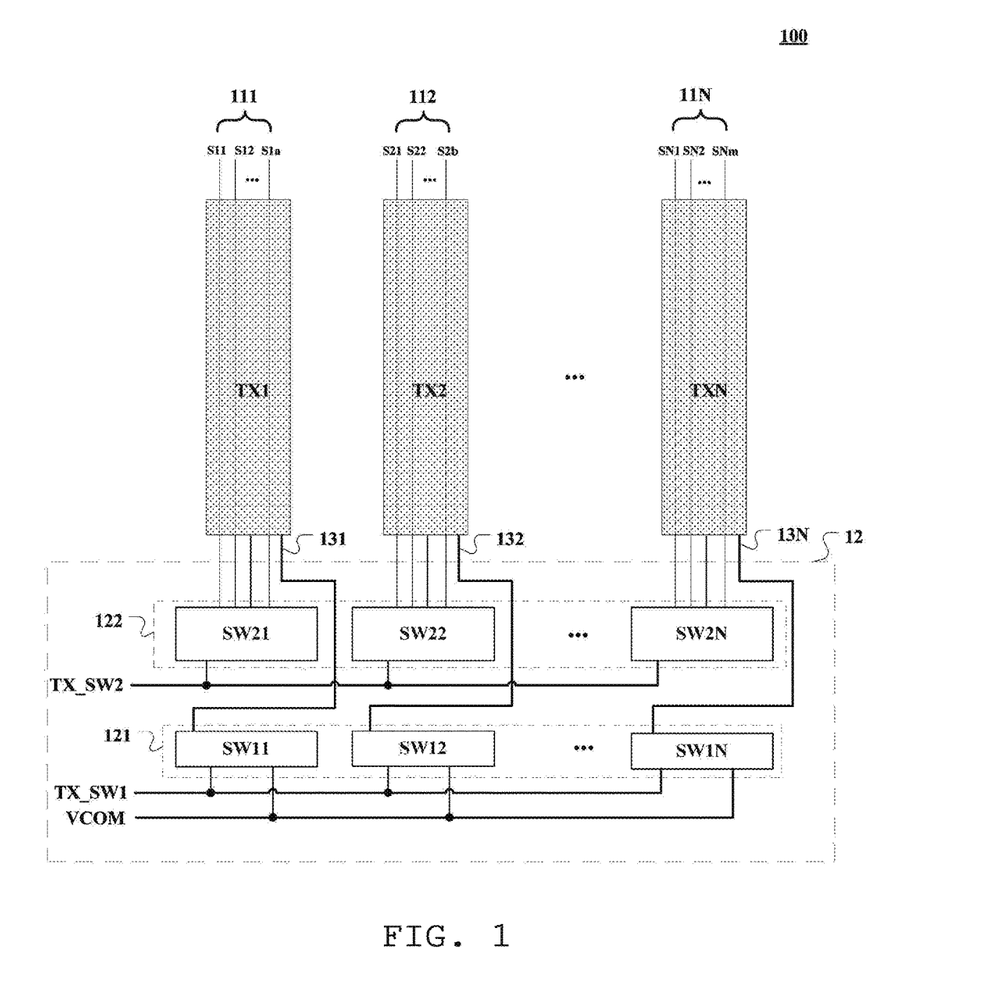
FIG. 1 is a schematic structural diagram of an array substrate according to an embodiment of the disclosure.

Reference will be made to FIG. 1 illustrating a schematic structural diagram of an embodiment of an array substrate according to the application. As illustrated in FIG. 1, the array substrate 100 includes a plurality of data lines S11, S12, . . . , S1a, S21, S22, . . . , S2b, SN1, SN2, . . . , SNm, a plurality of touch electrodes TX1, TX2, . . . , TXN, and a touch driving circuit 12, where a, b, m, and N are positive integers. The plurality of data lines S11, S12, . . . , S1a, S21, S22, . . . , S2b, SN1, SN2, . . . , SNm are divided into a plurality of data line groups 111, 112, . . . , 11N, where each data line group includes a plurality of data lines arranged in sequence, for example, the data line group 111 includes a number a of data lines S11, S12, . . . , S1a, the data line group 112 includes a number b of data lines S21, S22, . . . , S2b, and the data line group UN includes a number m of data lines SN1, SN2, . . . , SNm. Each data line group corresponds respectively to one of the touch electrodes, for example, the data line groups 111, 112, . . . , 11N correspond one-to-one to the touch electrodes TX1, TX2, . . . , TXN. Optionally the numbers of data lines in the respective data line groups are the same, that is, a, b, . . . , m are equal.

The touch driving circuit 12 includes a common signal line VCOM, a first switch unit 121 and a second switch unit 122. The first switch unit 121 is electrically connected to the respective touch electrodes TX1, TX2, . . . , TXN, and the first switch unit 121 is configured to electrically connect or disconnect the common signal line VCOM with or from the touch electrodes TX1, TX2, . . . , TXN, in response to a first control signal. The second switch unit 122 is electrically connected to the respective touch electrodes TX1, TX2, . . . , TXN, and the second switch unit 122 is configured to electrically connect or disconnect the respective data line groups 111, 112, . . . , 11N with or from the corresponding touch electrodes TX1, TX2, . . . , TXN under the control of a second control signal. If the data line groups 111, 112, . . . , 11N are electrically connected with the corresponding touch electrodes TX1, TX2, . . . , TXN, touch detecting signals are provided to at least one data line in each data line group will be provided with.

In this embodiment, the first switch unit 121 may be configured to electrically connect or disconnect the touch electrodes TX1, TX2, . . . , TXN with or from the common signal line VCOM, and when the first switch unit 121 electrically connects the touch electrodes TX1, TX2, . . . , TXN with the common signal line VCOM, the touch electrodes TX1, TX2, . . . , TXN may receive common voltage signals transmitted over the common signal line VCOM.

The second switch unit 122 may be configured to electrically connect or disconnect the touch electrodes TX1, TX2, . . . , TXN with or from the data line groups 111, 112, . . . , 11N, and if the second switch unit 122 electrically connects the touch electrodes TX1, TX2, . . . , TXN with the data line groups 111, 112, . . . , 11N, the data lines in the data line groups 111, 112, . . . , 11N may be used to transmit a touch detecting signal to the touch electrodes. In this way, the first switch unit 121 and the second switch unit 122 are configured so that the touch electrodes TX1, TX2, . . . , TXN can be driven by using the data lines without designing a shifting module and a driving module, thereby simplifying the structure of the touch driving circuit and facilitating reduction of the edge frame area.

In some embodiments, the touch driving circuit 12 further includes a first control signal line TX_SW1 and a second control signal line TX_SW2. The first control signal line TX_SW1 transmits the above-mentioned first control signal to the first switch unit 121. The second control signal line TX_SW2 transmits the above-mentioned second control signal to the second switch unit 122.

In some embodiments, the first switch unit 121 may include a plurality of first switches SW11, SW12, . . . , SW1N, each of the first switches SW11, SW12, . . . , SW1N may be configured to electrically connect or disconnect the common signal line VCOM with or from one of the touch electrodes TX1, TX2, . . . , TXN respectively. For example in FIG. 1, the first switch SW11 is configured to electrically connect or disconnect the touch electrode TX1 with or from the common signal line under the control of the first control signal which is transmitted by the first control signal line TX_SW1.

The second switch unit 122 may include a plurality of second switches SW21, SW22, . . . , SW2N, each of the second switches SW21, SW22, . . . , SW2N may be configured to electrically connect or disconnect one of the data line groups 111, 112, . . . , 11N with or from one of the touch electrodes TX1, TX2, . . . , TXN respectively. For example in FIG. 1, the second switch SW21 is configured to electrically connect or disconnect the touch electrode TX1 with or from the data line group 111 under the control of the second control signal which is transmitted by the second control signal line TX_SW2.

In some embodiments, the touch driving circuit further includes a plurality of touch signal lines 131, 132, . . . , 13N through which the first switch unit 121 is electrically connected with the touch electrodes. Further, each first switch in the first switch unit 121 may be electrically connected with one of the touch electrodes respectively through one touch signal line, for example, a first switch SW11 may be electrically connected with the touch electrode TX1 through the touch signal line 131. If the first switch SW11 is off, the signal on the common signal line VCOM will be transmitted to the touch electrode TX1 through the touch signal line 131. Alternatively, each of the touch electrodes TX1, TX2, . . . , TXN is connected with one of the touch signal lines 131, 132, . . . , 13N respectively, and each touch electrode receives the common voltage signal over one touch signal line respectively.

There can be a number of embodiments of the driving circuit in the array substrate in accordance with the disclosure, and the structure of the driving circuit and connections with other elements on the array substrate will be described in details with reference to FIG. 2 to FIG. 5.

Figure 2:
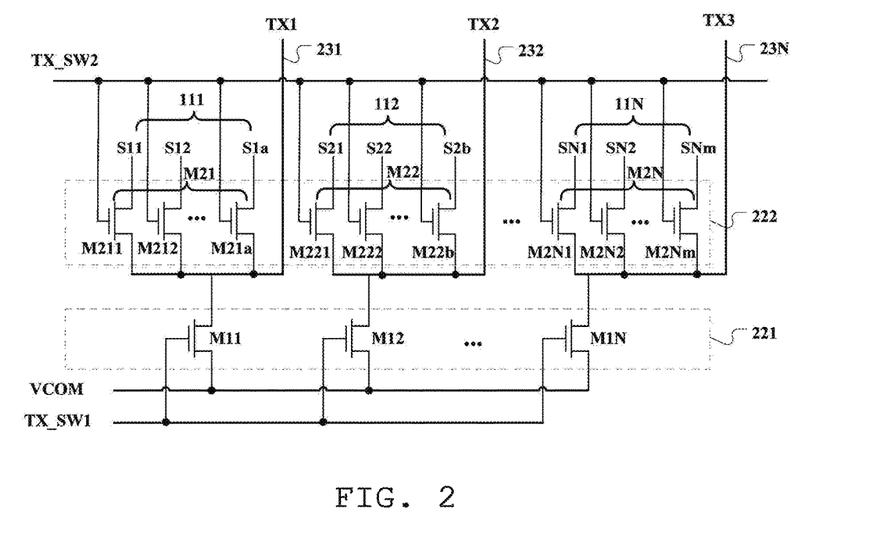
FIG. 2 is a schematic structural diagram of a touch driving circuit in an array substrate according to an embodiment of the disclosure.

Reference will be made to FIG. 2 illustrating a schematic structural diagram of a touch driving circuit in an array substrate according to an embodiment of the disclosure. As illustrated in FIG. 2, the driving circuit 200 includes a common signal line VCOM, a first switch unit 221, a second switch unit 222, a first control signal line TX_SW1, a second control signal TX_SW2, and a plurality of touch signal lines 231, 232, . . . , 23N, wherein each of the touch signal lines 231, 232, . . . , 23N may be electrically connected one-to-one with the touch electrodes TX1, TX2, . . . , TXN on the array substrate.

The first switch unit 221 includes a plurality of first transistors M11, M12, . . . , M1N, wherein each of the first transistors M11, M12, . . . , M1N has a gate electrically connected the first control signal line TX_SW1, a first terminal electrically connected with the common signal line VCOM, and a second terminal electrically connected with one touch signal line. Particularly taking the first transistor M11 as an example, the gated of the first transistor M11 is electrically connected with the first control signal line TX_SW1, the first terminal of the first transistor M11 is electrically connected with the common signal line VCOM, and the second terminal of the first transistor M11 is electrically connected with the touch signal line 231 which is electrically with the touch electrode TX1. Therefore, if the first transistor M11 is turned on, the common signal transmitted on the common signal line VCOM is transmitted to the second terminal of the first transistor M11 through the first terminal of the first transistor M11, and in turn to the touch electrode TX1 through the touch signal line 231.

The second switch unit 222 includes a plurality of second transistor groups M21, M22, . . . , M2N. Each of the second transistor groups M21, M22, . . . , M2N includes at least one second transistor, for example, the second transistor group M21 includes second transistors M211, M212, . . . , M21a, the second transistor group M22 includes second transistors M221, M222, . . . , M22b, and the second transistor group M2N includes second transistors M2N1, M2N2, . . . , M2Nm. The second transistor groups M21, M22, . . . , M2N correspond one-to-one to the touch electrodes TX1, TX2, . . . , TXN, and each of the data line groups 111, 112, . . . , 11N corresponds to one of the second transistor groups M21, M22, . . . , M2N, respectively. Alternatively, numbers of the data lines included in the respective data line groups are identical.

Gates of the second transistors M211, M212, . . . , M21a, M221, M222, . . . , M22b, M2N1, M2N2, . . . , M2Nm are electrically connected with the second control signal line. The first terminal of each of the second transistors in the second transistor groups is electrically connected with one of the data lines in the corresponding data line group respectively, for example, the first terminal of each of the second transistors M211, M212, . . . , M21a in the second transistor group M21 is connected one-to-one with the data lines S11, S12, . . . , S1a in the corresponding data line group 111. The second terminal of each second transistor is connected with its corresponding touch electrode, for example, the second terminal of the second transistor M211 is connected with the touch electrode TX1 corresponding to the second transistor group M21 including the second transistor M211. In this embodiment, the second terminal of each of the second transistors M211, M212, . . . , M21a, M221, M222, . . . , M22b, . . . , M2N1, M2N2, . . . , M2Nm is electrically connected with its corresponding touch signal line. Particularly, the second terminals of the second transistors M211, M212, . . . , M21a in the second transistor group M21 are connected with the corresponding touch signal line 231, the second terminals of the second transistors M221, M222, . . . , M22b in the second transistor group M22 are connected with the corresponding touch signal line 232, and the second terminals of the second transistors M2N1, M2N2, . . . , M2Nm in the second transistor group M2N are connected with the corresponding touch signal line 23N.

In this embodiment, the first transistors, the touch electrodes, the second transistor groups, and the data line groups correspond one-to-one to each other, the second transistor groups correspond one-to-one to the data line groups, and the second transistors in the second transistor groups correspond one-to-one to the data lines in the data line groups. If the corresponding data lines and the touch signal lines are turned on by the second transistor groups, at least one data line in the data line group may be provided with the touch detecting signal, where the touch signal line is electrically connected with the data line, and the touch electrode may receive the touch detecting signal through the touch signal line. Alternatively, if the second transistor group is turned on, all the data lines connected with the second transistor group may be provided with the touch detecting signal, and the touch signal line receives the touch detecting signal transmitted through the plurality of data lines, so that the stabilities of the touch signals received by the touch electrodes can be improved.

Figure 3:
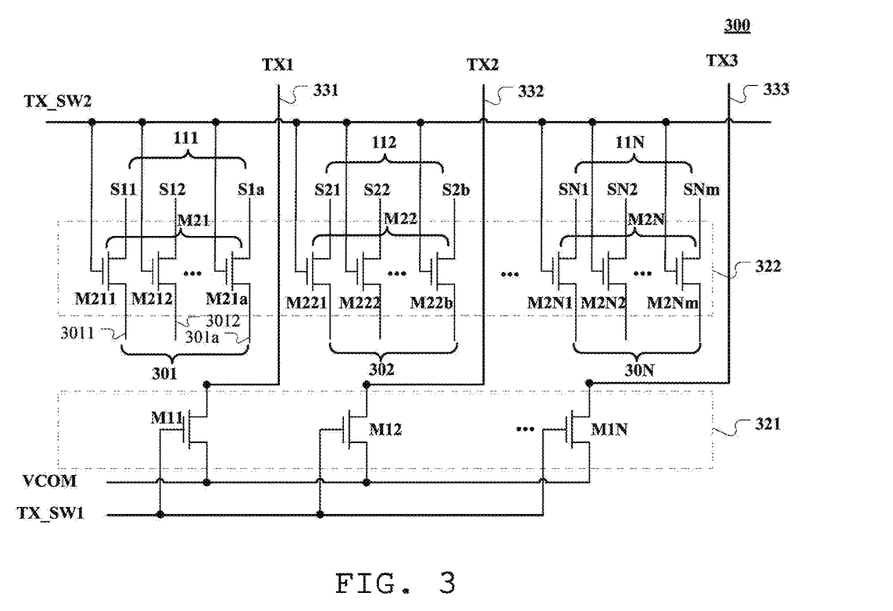
FIG. 3 is a schematic structural diagram of a touch driving circuit in an array substrate according to another embodiment of the disclosure.

Further reference will be made to FIG. 3 illustrating a schematic structural diagram of a touch driving circuit in an array substrate according to another embodiment of the disclosure. As illustrated in FIG. 3, the driving circuit 300 includes a common signal line VCOM, a first switch unit 321, a second switch unit 322, a first control signal line TX_SW1, a second control signal TX_SW2, and a plurality of touch signal lines 331, 332, . . . , 33N, wherein each of the touch signal lines 331, 332, . . . , 33N may be electrically connected one-to-one with the touch electrodes TX1, TX2, . . . , TXN on the array substrate.

The first switch unit 321 has a structure which is identical to that of the first switch unit 221 in the driving circuit 200 illustrated in FIG. 2 and includes a plurality of first transistors M11, M12, . . . , M1N, each of the first transistors M11, M12, . . . , M1N has a gate electrically connected with the first control signal line TX_SW1, a first terminal electrically connected with the common signal line VCOM, and a second terminal electrically connected with one touch signal line.

The second switch unit 222 includes a plurality of second transistor groups M21, M22, . . . , M2N. Each of the second transistor groups M21, M22, . . . , M2N includes at least one second transistor, for example, the second transistor group M21 includes second transistors M211, M212, . . . , M21a, the second transistor group M22 includes second transistors M221, M222, . . . , M22b, and the second transistor group M2N includes second transistors M2N1, M2N2, . . . , M2Nm. The second transistor groups M21, M22, . . . , M2N correspond one-to-one to the touch electrodes TX1, TX2, . . . , TXN, and each of the data line group 111, 112, . . . , 11N corresponds to one of the second transistor groups M21, M22, . . . , M2N, respectively. Each second transistor has a gate connected with the second control signal line TX_SW2, and a first terminal electrically connected respectively with one of data lines in its corresponding data line group. Alternatively, numbers of the data lines in the respective data line groups are identical.

In this embodiment, the touch driving circuit 300 further includes a plurality of touch lead groups 301, 302, . . . , 30N, each touch lead group includes a plurality of touch leads, for example, the touch lead group 301 includes touch leads 3011, 3012, . . . , 301a. The touch electrodes TX1, TX2, . . . , TXN are electrically connected one-to-one with the touch lead groups 301, 302, . . . , 30N. The second transistor groups M21, M22, . . . , M2N correspond one-to-one to the touch lead groups 301, 302, . . . , 30N, wherein a second terminal of each second transistor is electrically connected with one touch lead in its corresponding touch lead group, respectively, for example, the second terminal of the second transistor M211 is electrically connected with the touch lead 3011 in the corresponding touch lead group 301.

Further in FIG. 3, the number of the touch leads in each touch lead group is the same as that of the second transistors in its corresponding second transistor group. The second terminal of each second transistor is connected respectively with one of the touch leads, and thus the second terminal of each second transistor is connected with its corresponding touch electrode respectively through the touch lead. For example, the second terminals of the second transistors M211, M212, . . . , M21a are connected with the respective touch electrode TX1 respectively through the touch leads 3011, 3012, . . . , 301a.

Unlike the embodiment illustrated in FIG. 2, the second switch unit 322 in the driving circuit 300 illustrated in FIG. 3 is connected to the touch electrodes through the touch lead groups, each of the touch lead groups may include a plurality of touch leads, and then if one of the touch leads is broken or becomes abnormal otherwise, the touch detecting signal may be transmitted through other touch leads, so that the stability of the touch driving circuit can be further improved.

Figure 4:
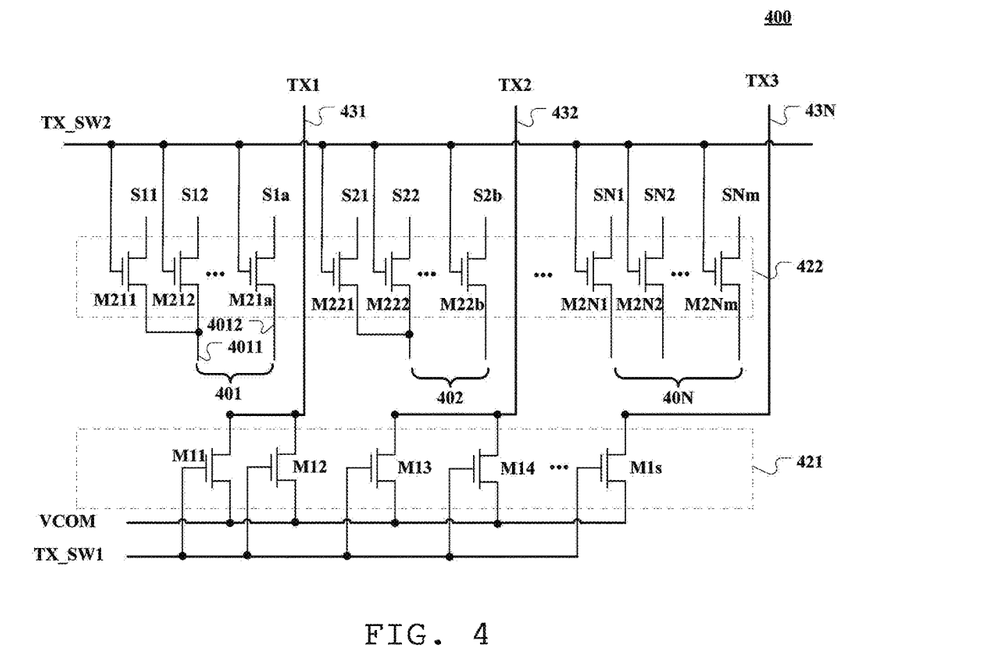
FIG. 4 is a schematic structural diagram of a touch driving circuit in an array substrate according to still another embodiment of the disclosure.

Further reference will be made to FIG. 4 illustrating a schematic structural diagram of a touch driving circuit in an array substrate according to still another embodiment of the disclosure.

As illustrated in FIG. 4, the driving circuit 400 includes a common signal line VCOM, a first switch unit 421, a second switch unit 422, a first control signal line TX_SW1, a second control signal TX_SW2, and a plurality of touch signal lines 431, 432, . . . , 43N, wherein each of the touch signal lines 431, 432, . . . , 43N may be electrically connected one-to-one with the touch electrodes TX1, TX2, . . . , TXN on the array substrate.

The first switch unit 421 includes a plurality of first transistors M11, M12, M13, M14, . . . , M1s, where s is a positive integer, and s is larger than N.

Each of the first transistors M11, M12, M13, M14, . . . , M1s has a gate electrically connected with the first control signal line TX_SW1, a first terminal electrically connected with the common signal line VCOM, and a second terminal electrically connected with one of the touch signal lines.

Unlike the embodiments illustrated in FIG. 2 and FIG. 3, in the touch driving circuit 400, each touch signal line may be electrically connected with the second terminals of a plurality of first transistors, for example, the touch signal line 431 is connected with the second terminals of the first transistors M11 and M12. Therefore, each touch driving electrode may receive a common voltage signal transmitted by the plurality of first transistors, so that if one of the first transistors fails, the common voltage signal transmitted over the common signal line VCOM can be received normally through other first transistors, thereby ensuring the normal operation of the array substrate.

Furthermore, the touch driving circuit 400 illustrated in FIG. 4 further includes a plurality of touch lead groups 401, 402, . . . , 40N, wherein each touch lead group includes one or more touch leads, for example, the touch lead group 401 includes two touch leads 4011 and 4012. The touch electrodes TX1, TX2, . . . , TXN are electrically connected one-to-one with the touch lead groups 401, 402, . . . , 40N. The second transistor groups M21, M22, . . . , M2N correspond one-to-one to the touch lead groups 401, 402, . . . , 40N, wherein a second terminal of each second transistor is electrically connected respectively with one of touch leads in the corresponding touch lead group. For example, the second terminal of the second transistor M211 is electrically connected with the touch lead 4011 in the corresponding touch lead group 401, and the second terminal of the second transistor M21a is electrically connected with the touch lead 4012 in the corresponding touch lead group 401.

As can be seen from FIG. 4, the number of touch leads in each touch lead group in the touch driving circuit 400 may be different from that of the second transistors in its corresponding second transistor group. The second terminals of a plurality of second transistors in the same second transistor group may be electrically connected with the same touch lead, and as compared with the embodiment illustrated in FIG. 3, the number of the touch leads in the touch driving circuit 400 in this embodiment is reduced, thereby alleviating the noise in the circuit.

Figure 5:
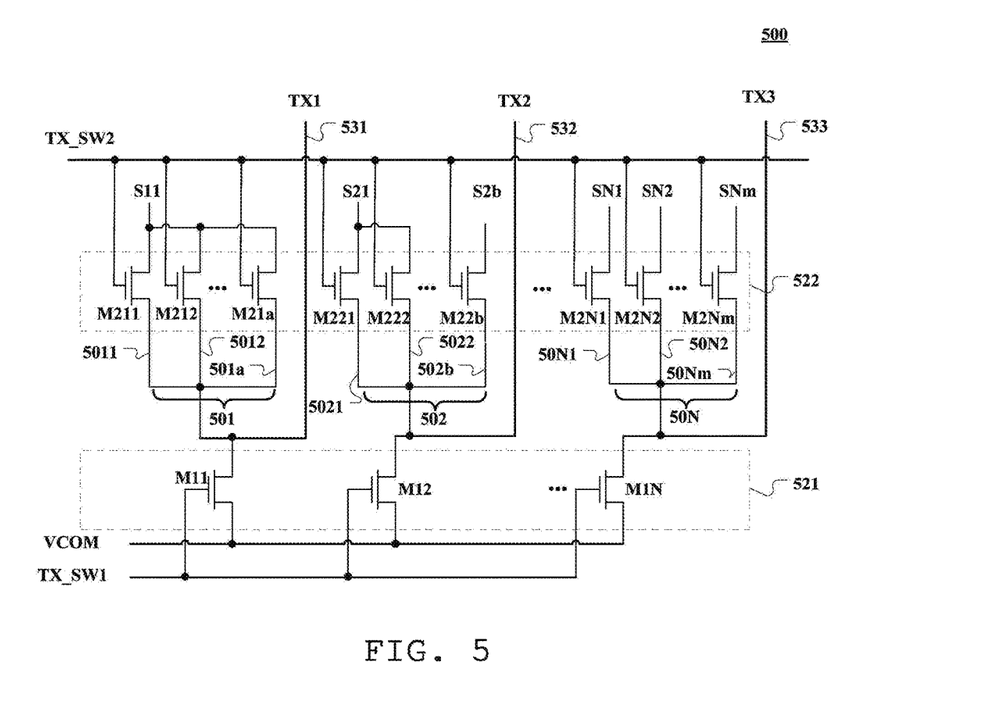
FIG. 5 is a schematic structural diagram of a touch driving circuit in an array substrate according to a further embodiment of the disclosure.

Further reference will be made to FIG. 5 illustrating a schematic structural diagram of a touch driving circuit in an array substrate according to a further embodiment of the disclosure. As illustrated in FIG. 5, the driving circuit 500 includes a common signal line VCOM, a first switch unit 521, a second switch unit 522, a first control signal line TX_SW1, a second control signal TX_SW2, and a plurality of touch signal lines 531, 532, . . . , 53N, wherein the respective touch signal lines 531, 532, . . . , 53N may be electrically connected one-to-one with the touch electrodes TX1, TX2, . . . , TXN on the array substrate.

As can be seen from FIG. 5, unlike the embodiment illustrated in FIG. 2, second terminals of a plurality of second transistors in a second transistor group may be connected with the same data line, for example, all the second terminals of the second transistors M211, M212 and M21a are connected with the data line S11, and both the second terminals of the second transistors M221 and M222 are connected with the data line S21.

Further to the touch driving circuit 200 illustrated in FIG. 2, in the touch driving circuit 500, each touch lead group is electrically connected with one of the touch signal lines rather than being electrically connected directly with one of the touch electrodes. For example, the touch lead group 501 is electrically connected with the touch signal line 531, the touch lead group 502 is electrically connected with the touch signal line 532, and the touch lead group 50N is electrically connected with the touch signal line 53N.

Therefore, when a second transistor group is turned on, the first terminals of a plurality of second transistors in this second transistor group will receive a touch detecting signal transmitted through the data lines, and then transmit the touch detecting signal to the touch signal lines through the plurality of touch leads, and to the touch electrodes through the touch signal lines. As compared with the touch control circuit illustrated in FIG. 2, the wiring mode of the touch leads and the touch signal lines can be designed more reasonably, thereby further reducing the occupied space of the touch driving circuit and achieving a narrow bezel design.

Figure 6:
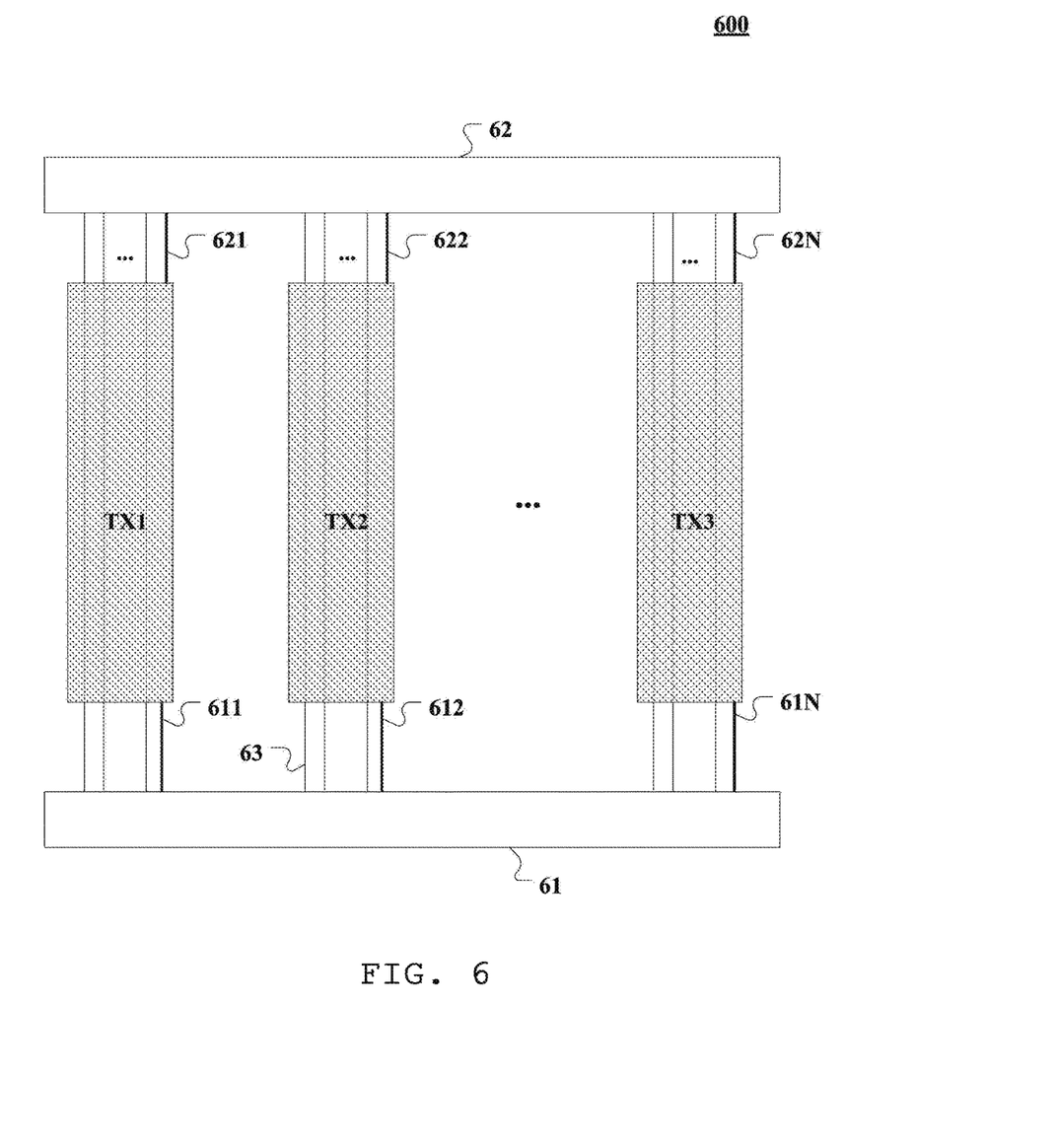
FIG. 6 is a schematic structural diagram of an array substrate according to another embodiment of the disclosure.

Reference will be made to FIG. 6 illustrating a schematic structural diagram of an array substrate according to another embodiment of the disclosure. As illustrated in FIG. 6, the array substrate includes a plurality of data lines 63, a plurality of touch electrodes TX1, TX2, . . . , TXN, a touch driving circuit 61 and 62, wherein the plurality of data lines 63 are divided into a plurality of data line groups, each data line group includes a plurality of data lines arranged in sequence, and each data line group corresponds to one of the touch electrodes.

In this embodiment, the touch driving circuit 61 and 62 may be any one of the touch driving circuits described above with reference to FIG. 2 to FIG. 5.

The touch electrodes TX1, TX2, . . . , TXN are strip-shaped electrodes, and the touch driving circuit 61 and 62 are arranged respectively on both ends of the touch electrodes TX1, TX2, . . . , TXN along their extending directions. Alternatively, the extending directions of the touch electrodes TX1, TX2, . . . , TXN are the same as that of the data lines 63.

In a display period, the touch electrodes TX1, TX2, . . . , TXN are used as common electrodes, respectively. The touch driving circuit 61 and the touch driving circuit 62 may have the same circuit structure including a first switch unit and a second switch unit. The first switch unit in the touch driving circuit 61, and the first switch unit in the touch driving circuit 62 are connected with the touch electrode TX1 respectively through the touch signal lines 611 and 621, the first switch unit in the touch driving circuit 61, and the first switch unit in the touch driving circuit 62 are connected with the touch electrode TX2 respectively through the touch signal lines 612 and 622, and the first switch unit in the touch driving circuit 61, and the first switch unit in the touch driving circuit 62 are connected with the touch electrode TXN respectively through the touch signal lines 61N or 62N.

Figure 7:
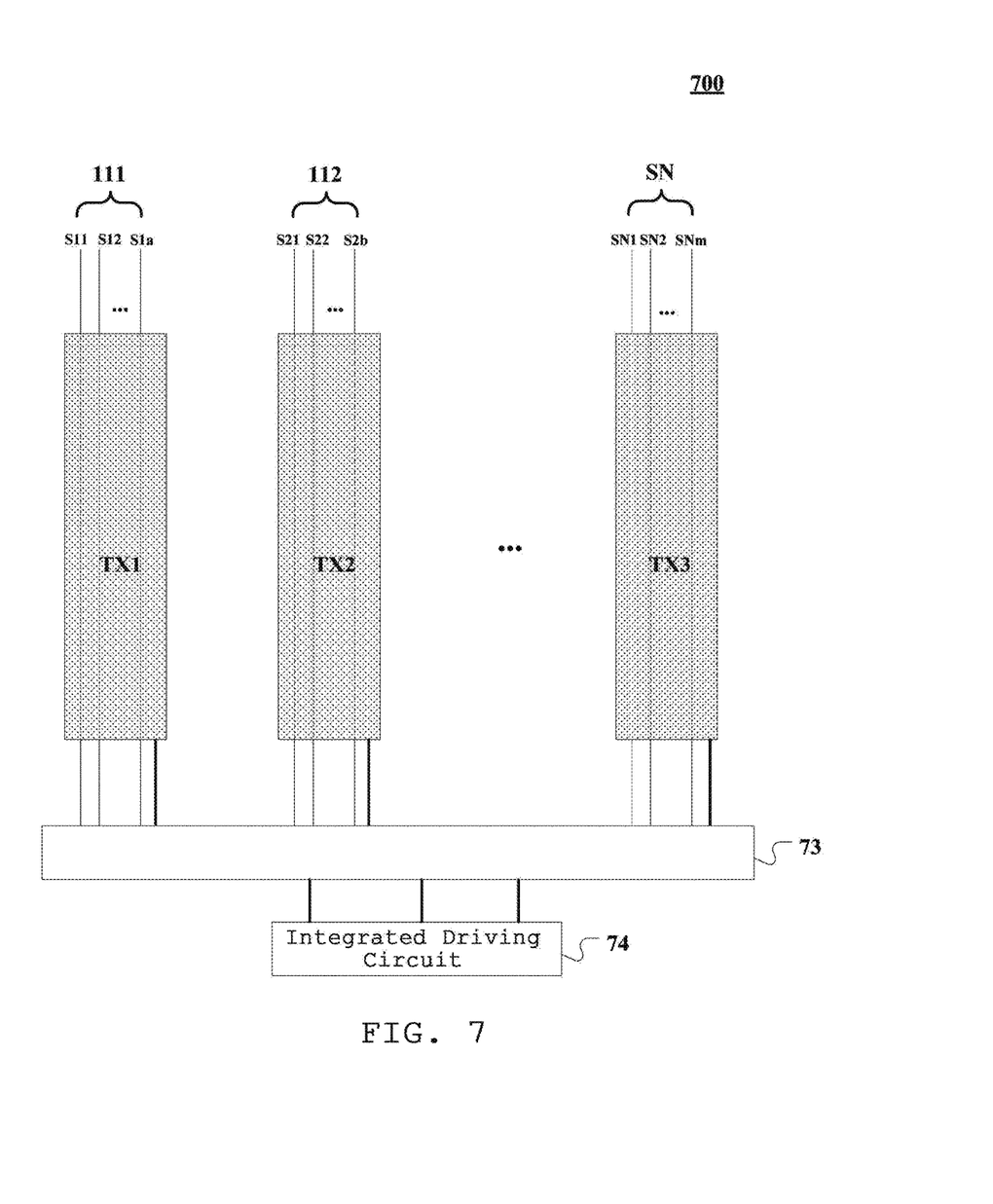
FIG. 7 is a schematic structural diagram of an array substrate according to still another embodiment of the disclosure.

Further reference will be made to FIG. 7 illustrating a schematic structural diagram of an array substrate according to still another embodiment of the disclosure. As illustrated in FIG. 7, the array substrate 700 includes a plurality of data line groups 111, 112, . . . , 11N, a plurality of touch electrodes TX1, TX2, . . . , TXN, and a touch driving circuit 73, wherein the touch driving circuit may be the touch driving circuit 12 illustrated in FIG. 1. Further to the array substrate 100 illustrated in FIG. 1, the array substrate 700 further includes an integrated driving circuit 74 which is electrically connected with the touch driving circuit 73.

The first control signal includes a first ON signal and a first OFF signal, and the second control signal includes a second ON signal and a second OFF signal. The integrated driving circuit 74 controls the array substrate 700 to enter a display period and a touch detection period alternately. During the display period, the integrated driving circuit 74 provides the touch driving circuit 73 with the first ON signal, and provides the touch driving circuit 73 with the second OFF signal, so that the first switch unit is on and the second switch unit is off, and a common voltage signal transmitted over the common signal line is transmitted to the touch electrodes TX1, TX2, . . . , TXN through the first switch unit. During the touch detection period, the integrated driving circuit 74 provides the touch driving circuit 73 with the first ON signal, and provides the touch driving circuit with the second OFF signal, so that the first switch unit is on and the second switch unit is off, and the touch detecting signals transmitted over the data lines are transmitted to the touch electrodes TX1, TX2, . . . , TXN through the second switch unit.

Embodiments further provide a driving method for the above mentioned array substrate, wherein a first control signal includes a first ON signal and a first OFF signal, and a second control signal includes a second ON signal and a second OFF signal. An operating process of the array substrate includes a display period and a touch detection period.

The above mentioned driving method includes, during the display period, providing the first switch unit with the first ON signal to electrically connect the common signal line with the touch electrodes, providing the second switch unit with the second OFF signal to disconnect the data line groups from the touch electrodes, providing the common signal line with the common voltage signal, and providing the data lines with the data signal; and during the touch detection period, providing the first switch unit with the first OFF signal to disconnect the common signal line from the touch electrodes, providing the second switch unit with the second ON signal to electrically connect at least one data line in each data line group with the corresponding touch electrode, and providing the at least one data line with the touch detecting signal.

Furthermore, the touch driving circuit may be any one of the touch driving circuits illustrated in FIG. 2 to FIG. 5, and further includes a plurality of touch signal lines; the first switch unit includes a plurality of first transistors, each having a gate electrically connected with the first control signal line, a first terminal electrically connected with the common electrode line, and a second terminal electrically connected one-to-one with the touch signal lines; and the second switch unit includes at least one second transistor group, each including at least second transistor, wherein the second transistor group corresponds one-to-one to the touch electrodes, and each second transistor has a gate electrically connected with the second control signal line, a first terminal electrically connected respectively with one of the data lines, and a second terminal electrically connected respectively with its corresponding touch electrode.

For the array substrate including any one of the touch driving circuits illustrated in FIG. 2 to FIG. 5, the driving method according to an embodiment of the disclosure further includes: during the display period, providing the first transistors with the first ON signal to turn on the first transistors; and during the touch detection period, providing the second transistor group with the second ON signal to turn on all the second transistors in the second transistor group.

Figure 8:
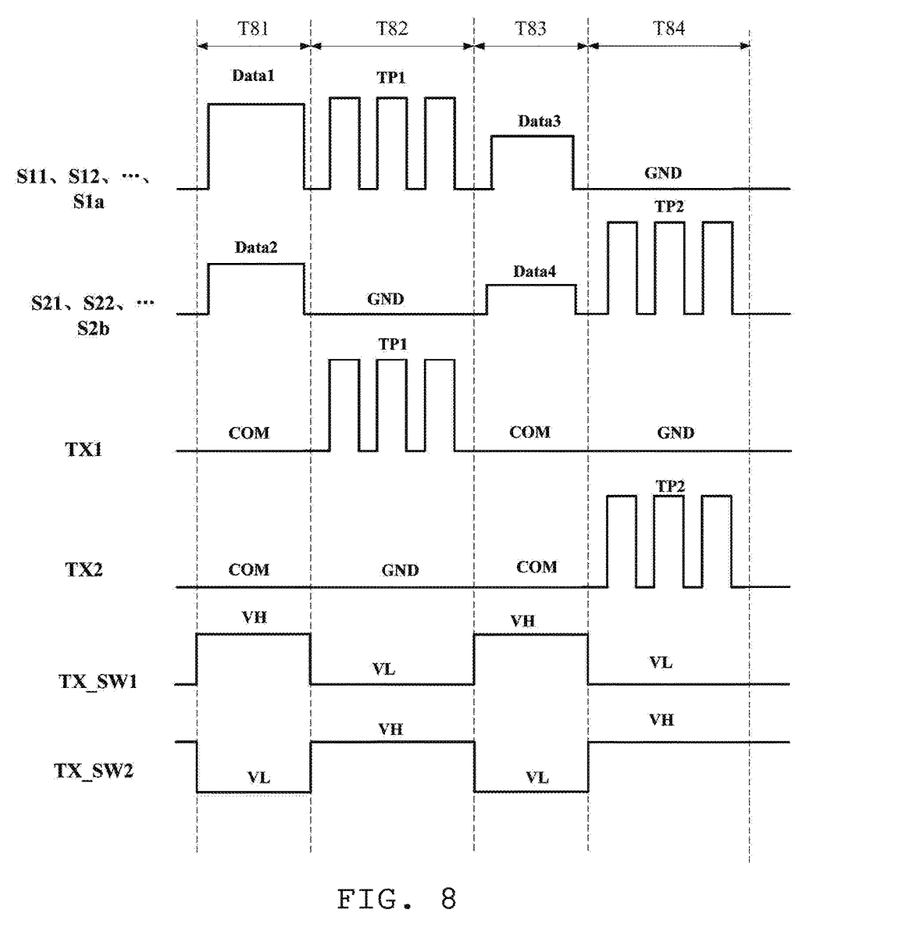
FIG. 8 is a schematic operating timing diagram of the array substrate illustrated in FIG. 1.
Figure 9:
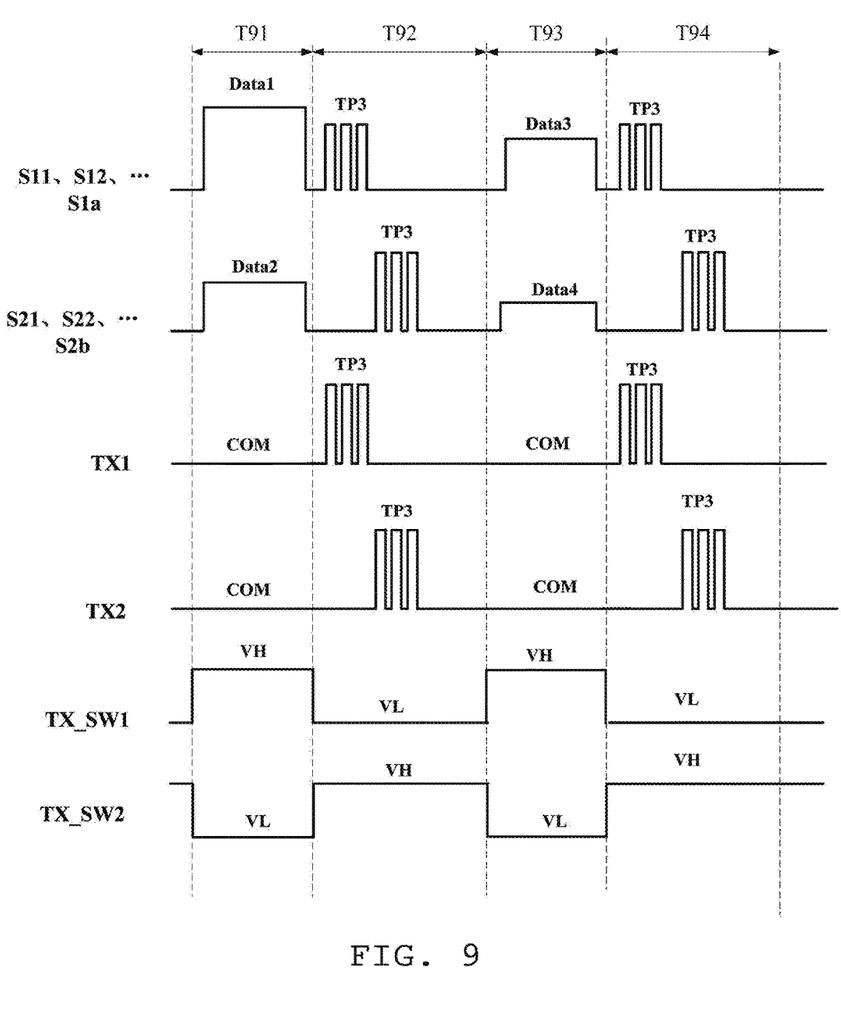
FIG. 9 is another schematic operating timing diagram of the array substrate illustrated in FIG. 1.

Reference will be made to FIG. 8 and FIG. 9 illustrating two schematic operation timing diagrams of the array substrate illustrated in FIG. 1, wherein S11, S12, . . . , S1a represent signals transmitted over the respective data lines in the first data line group 111; S21, S22, . . . , S2b represent signals transmitted over the respective data lines in the second data line group 112; TX_SW1 represents a signal provided to the first control signal line; TX_SW2 represents a signal provided to the second control signal line; TX1 represents a signal received by the touch electrode TX1; and TX2 represents a signal received by the touch electrode TX2.

As illustrated in FIG. 8, during a display period T81, the first control signal line TX_SW1 is provided with the first ON signal VH, the second control signal line TX_SW2 is provided with the second OFF signal VL, the data lines S11, S12, . . . , S1a are provided with a data signal Data1, the data lines S21, S22, . . . , S2b are provided with a data signal Data2, and the common signal line VCOM is provided with a common voltage signal COM to be received by the touch electrodes TX1 and TX2.

During a touch detection period T82, the first control signal line TX_SW1 is provided with the first OFF signal VL, the second control line TX_SW2 is provided with the second ON signal VH, the data lines S11, S12, . . . , S1a are provided with a touch detecting signal TP1, and the data lines S21, S22, . . . , S2b are provided with a ground voltage signal GND, wherein the touch detecting signal TP1 is to be received by the touch electrode TX1, and the ground voltage signal GND is to be received by the touch electrode TX2.

During a display period T83 similar to the display period T81, the touch electrodes TX1 and TX2 being as a common electrode, respectively receive the common voltage signal COM, the data lines S11, S12, . . . , S1a receive a data signal Data3, and the data lines S21, S22, . . . , S2b receive a data signal Data4.

During a touch detection period T84, the first control signal line TX_SW1 is provided with the first OFF signal VL, the second control line TX_SW2 is provided with the second ON signal VH, the data lines S11, S12, . . . , S1a are provided with the ground voltage signal GND, and the data lines S21, S22, . . . , S2b are provided with a touch detecting signal TP2, wherein the ground voltage signal GND is to be received by the touch electrode TX1, and the touch detecting signal TP2 is to be received by the touch electrode TX2.

In the above mentioned embodiment, during the two touch detection periods T82 and T84, the second control line TX_SW2 is provided with the second ON signal VH, and thus the respective second transistor groups are turned on. In some embodiments, one of the data line groups may be provided with a touch detecting signal respectively during each touch detection period, that is, the data line group corresponding to the touch electrode TX1 is provided with a touch detecting signal during the touch detection period T82, and the data line group corresponding to the touch electrode TX2 is provided with a touch detecting signal during the touch detection period T84. Herein, the touch detecting signal may be a periodical pulse signal.

As illustrated in FIG. 9, during display periods T91 and T93, similar to the display periods T81 and T83, the first control signal line TX_SW1 is provided with the first ON signal VH, the second control line TX_SW2 is provided with the second OFF signal VL, the data lines S11, S12, . . . , S1a are provided with a data signal Data1, the data lines S21, S22, . . . , S2b are provided with a data signal Data2, and the common signal line VCOM is provided with the common voltage signal COM to be received by the touch electrodes TX1 and TX2.

During touch detection periods T92 and T94, the first control signal line TX_SW1 is provided with the first OFF signal VL, the second control line TX_SW2 is provided with the second ON signal VH, and the data line groups are provided with a touch detecting signal TP3 group by group, that is, after the data lines S11, S12, . . . , S1a are provided with the touch detecting signal TP3, the data lines S21, S22, . . . , S2b are provided with the touch detecting signal TP3, wherein the touch detecting signal TP3 is to be sequentially received by the touch electrodes TX1 and TX2.

In the above mentioned embodiment, during each of the touch detection periods T92 and T94, the second control signal TX_SW2 is provided with the second ON signal VH, and thus the respective second transistor groups are turned on. In some embodiments, the data line groups may be provided with the touch detecting signal group by group during each touch detection period, that is, a plurality of data line groups are provided sequentially with the touch detecting signal during the touch detection period. In this embodiment, the touch scanning for all the touch electrodes can be implemented during each touch detection period. Herein, the touch detecting signal can be a periodical pulse signal.

The driving method according to the above mentioned embodiments can be applicable to the integrated driving circuit of the array substrate, wherein the integrated driving circuit provides the touch driving circuit with the first control signal and the second control signal, and transmits the touch detecting signal(s) to the data lines, so as to drive the touch electrodes. As compared with the touch driving circuit including the shifting module and the driving module in the prior art, the touch driving circuit according to the embodiments simplify the driving method, thereby lowering the power consumption of the array substrate.

Figure 10:
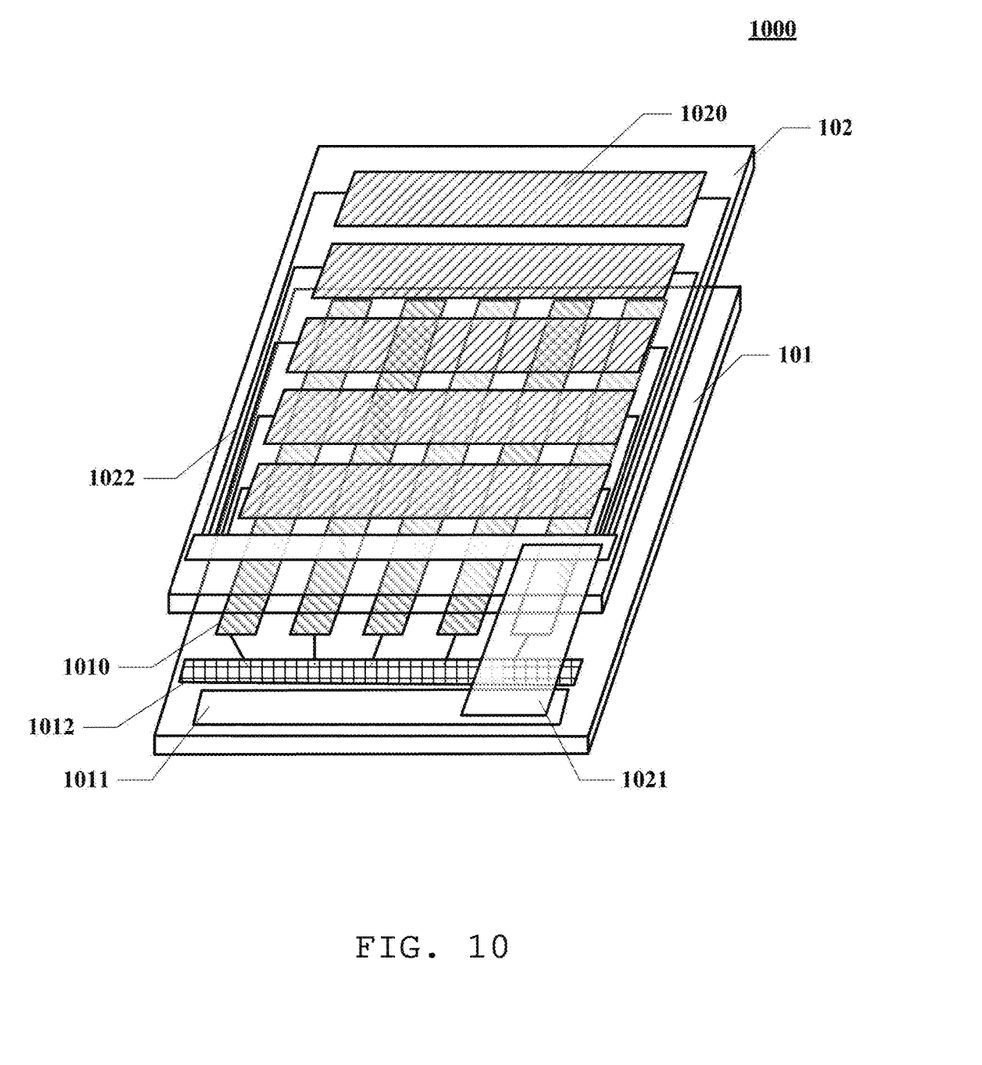
FIG. 10 is a schematic structural diagram of a display panel according to an embodiment of the disclosure.

Reference will be made to FIG. 10 illustrating a schematic structural diagram of a display panel according to an embodiment of the disclosure.

As illustrated in FIG. 10, the display panel 1000 includes an array substrate 101 and a color film substrate 102 arranged opposite to the array substrate 101, wherein the array substrate 101 may be any one of the array substrates described above with reference to FIG. 1 to FIG. 7. The array substrate 101 may include thereon data lines (not illustrated), a touch driving circuit 1012, and a plurality of touch electrodes, each of which is the first touch electrode 1010.

Second touch electrodes 1020 are provided on the color film substrate 102, wherein the extending direction of the second touch electrodes 1020 intersects with the extending direction of the touch sub-electrodes 1001 in the first touch electrodes 1010.

Alternatively, the extending direction of the first touch electrode 1010 is the same as that of the data lines. The second touch electrodes 1020 are strip-shaped touch electrodes, and have extending directions perpendicular to the extending directions of the first touch electrodes 1010.

In this embodiment, the display panel 1000 may further include a flexible circuit board 1021. The array substrate 101 further includes a driving circuit 1011, the color film substrate 102 thereon may be provided with touch signal lines 1022 through which the second touch electrodes 1020 are electrically connected with the flexible circuit board 1021, and the flexible circuit board 1021 is electrically connected with the driving circuit 1011. In this way, the touch signal lines 1022 on the color film substrate 102, which are electrically connected with the respective second touch electrodes 1020 converge and are electrically connected with the flexible circuit board 1021, and then the flexible circuit board 1021 is electrically connected with the driving circuit 1011, so that the driving circuit 1011 may receive signals returned from the second touch electrodes 1020.

In the display panel according to the above mentioned embodiments, the bezel area of the display panel, particularly the bezel width in the extending direction of the first touch electrodes can be decreased by simplifying the structure of the touch driving circuit, and also the driving power consumption can be reduced.

Figure 11:
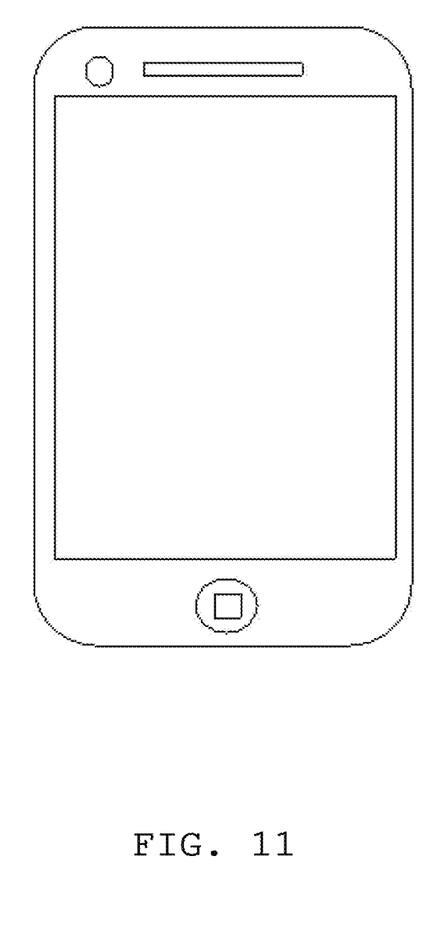
FIG. 11 is a display device of the disclosure.

Embodiments further provide a display device as illustrated in FIG. 11, which may be a liquid crystal display device including the display panel 1000, e.g., a mobile phone.

It should be appreciated that the display device may further include a backlight source, a light guiding plate, a liquid crystal layer between the array substrate 101 and the color film substrate, polarizing sheets, protecting glass, and other well-known structures, and thus a repeated description thereof will be omitted here.

The above merely describes various embodiments and some technical principles in accordance with the disclosure. Those skilled in the art should understand that the inventive scope involved in the present disclosure is not limited to technical solutions assembled using specific combinations of the above technical features, but would cover other technical solutions formed by any combinations of the above technical features or equivalent features thereof without departing from the inventive concept of the disclosure, for example, the technical solutions formed by replacing the above features with technical features having similar functions as disclosed in (not limited to) the present disclosure.

What is claimed is:

1. An array substrate, comprising:
   a plurality of data lines, a plurality of touch electrodes and a touch driving circuit; and, wherein
      the plurality of data lines are divided into a plurality of data line groups, each of the data line groups comprising a plurality of data lines arranged in sequence, and each of the data line groups corresponding respectively to one of the respective touch electrodes;
      the touch driving circuit comprises a common signal line, a first switch unit and a second switch unit;
      the first switch unit and the second switch unit are electrically connected with the touch electrodes;
      the first switch unit is configured to electrically connect or disconnect the common signal line with or from the touch electrodes in response to a first control signal;
      the second switch unit is controlled by a second control signal to electrically connect or disconnect the respective data line groups with or from the corresponding touch electrodes; and
      when the data line groups are electrically connected with the touch electrodes, at least one data line in each of the data line groups is provided with a touch detecting signal.

2. The array substrate according to claim 1, wherein the touch driving circuit further comprises a first control signal line and a second control signal line;
   the first control signal line is configured to transmit the first control signal to the first switch unit; and
   the second control signal line is configured to transmit the second control signal to the second switch unit.

3. The array substrate according to claim 2, wherein the touch driving circuit further comprises a plurality of touch signal lines; and
   the first switch unit is electrically connected with the touch electrodes through the touch signal lines.

4. The array substrate according to claim 3, wherein the first switch unit comprises a plurality of first transistors,
   gates of the first transistors are electrically connected with the first control signal line, first terminals of the first transistors are electrically connected with the common signal line, and second terminals of the first transistors are electrically connected with the touch signal line; and, wherein
   the second switch unit comprises a plurality of second transistor groups, each of the second transistor groups comprising at least one second transistor, and the second transistor groups corresponding one-to-one to the touch electrodes;
   each of the data line groups corresponds to one of the second transistor groups, respectively; and
   gates of the second transistors are electrically connected with the second control signal line, a first terminal of each of the second transistors in the second transistor groups is electrically connected respectively with one of the data lines in the corresponding data line group, and a second terminal of each of the second transistors in the second transistor groups is electrically connected with the corresponding touch electrode.

5. The array substrate according to claim 4, wherein the touch driving circuit further comprises a plurality of touch lead groups, each of the touch lead groups comprising a plurality of touch leads, and the touch electrodes being electrically connected one-to-one with the touch lead groups;
   the second transistor groups correspond one-to-one to the touch lead groups; and
   the second terminal of each of the second transistors is electrically connected respectively with one of the touch leads in the corresponding touch lead groups.

6. The array substrate according to claim 4, wherein the second terminal of each of the second transistors is electrically connected with the corresponding touch signal line, respectively.

7. The array substrate according to claim 4, wherein the numbers of the data lines in the respective data line groups are equal.

8. The array substrate according to claim 1, wherein the touch electrodes are strip-shaped electrodes, the array substrate comprising two touch driving circuits arranged respectively on both ends of the touch electrodes along extending directions of the touch electrodes.

9. The array substrate according to claim 8, wherein
   the extending directions of the touch electrodes are the same as the extending directions of the data lines; and
   the touch electrode is used as a common electrode.

10. The array substrate according to claim 1, wherein the array substrate further comprises an integrated driving circuit which is connected with the touch driving circuit;
    the first control signal comprises a first ON signal and a first OFF signal, and the second control signal comprises a second ON signal and a second OFF signal;
    the integrated driving circuit controls the array substrate to enter a display period and a touch detection period alternately;
    during the display period, the integrated driving circuit provides the touch driving circuit with the first ON signal, and provides the touch driving circuit with the second OFF signal; and
    during the touch detection period, the integrated driving circuit provides the touch driving circuit with the first OFF signal, and provides the touch driving circuit with the second ON signal.

11. A driving method for an array substrate, wherein the array substrate comprises a plurality of data lines, a plurality of touch electrodes and a touch driving circuit; wherein the plurality of data lines are divided into a plurality of data line groups, each of the data line groups comprising a plurality of data lines arranged in sequence, and each of the data line groups corresponding respectively to one of the respective touch electrodes;

the touch driving circuit comprises a common signal line, a first switch unit and a second switch unit;

the first switch unit and the second switch unit are electrically connected with the touch electrodes;

the first switch unit is configured to electrically connect or disconnect the common signal line with or from the touch electrodes in response to a first control signal;

the second switch unit is controlled by a second control signal to electrically connect or disconnect the respective data line groups with or from the corresponding touch electrodes; and when the data line groups are electrically connected with the touch electrodes, at least one data line in each of the data line groups is provided with a touch detecting signal, and, wherein the first control signal comprises a first ON signal and a first OFF signal, and the second control signal comprises a second ON signal and a second OFF signal; and an operating process of the array substrate comprises a display period and a touch detection period; and, wherein the driving method further comprises:

during the display period: providing the first switch unit with the first ON signal to electrically connect the common signal line with the touch electrodes, providing the second switch unit with the second OFF signal to disconnect the data line groups from the touch electrodes, providing the common signal line with a common voltage signal, and providing the data lines with a data signal; and during the touch detection period: providing the first switch unit with the first OFF signal to disconnect the common signal line from the touch electrodes, providing the second switch unit with the second ON signal to electrically connect at least one data line in each data line group with the corresponding touch electrode, and providing the at least one data line with a touch detecting signal.

12. The driving method according to claim 11, wherein the touch driving circuit further comprises a plurality of touch signal lines;

the first switch unit comprises a plurality of first transistors;

gates of the first transistors are electrically connected with the first control signal line, first terminals of the first transistors are electrically connected with the common electrode line, and second terminals of the first transistors are electrically connected one-to-one with the touch signal lines;

the second switch unit comprises at least one second transistor group, each of the second transistor group comprising at least second transistor, wherein the second transistor group corresponds one-to-one to the touch electrodes;

gates of the second transistors are electrically connected with the second control signal line, a first terminal of each of the second transistors is electrically connected respectively with one of the data lines, and a second terminal of each of the second transistors is electrically connected respectively with the corresponding touch electrode; and, wherein, the method further comprises:

during the display period, providing the first transistors with the first ON signal to turn on the first transistors; and during the touch detection period, providing the second transistor group with the second ON signal to turn on all the second transistors in the second transistor group.

13. The driving method according to claim 12, wherein the driving method further comprises:

providing one of the data line groups with the touch detecting signal respectively, during each of the touch detection periods.

14. The driving method according to claim 12, wherein the driving method further comprises:

providing the data line groups group by group with the touch detecting signal, during each of the touch detection periods.

15. The driving method according to claim 11, wherein the touch detecting signal comprises a periodical pulse signal.

16. A display panel, comprising an array substrate, wherein the array substrate comprises a plurality of data lines, a plurality of touch electrodes and a touch driving circuit; wherein the plurality of data lines are divided into a plurality of data line groups, each of the data line groups comprising a plurality of data lines arranged in sequence, and each of the data line groups corresponding respectively to one of the respective touch electrodes;

the touch driving circuit comprises a common signal line, a first switch unit and a second switch unit;

the first switch unit and the second switch unit are electrically connected with the touch electrodes;

the first switch unit is configured to electrically connect or disconnect the common signal line with or from the touch electrodes in response to a first control signal;

the second switch unit is controlled by a second control signal to electrically connect or disconnect the respective data line groups with or from the corresponding touch electrodes; and when the data line groups are electrically connected with the touch electrodes, at least one data line in each of the data line groups is provided with a touch detecting signal; and a color film substrate arranged opposite to the array substrate; and wherein the touch electrodes are first touch electrodes, the color film substrate are provided thereon with second touch electrodes, and extending directions of the second touch electrodes are the same as that of the first touch electrodes.

17. The display panel according to claim 16, wherein the extending directions of the first touch electrodes are the same as the extending directions of the data lines; and the extending directions of the second touch electrodes are perpendicular to the extending directions of the first touch electrodes.

18. A display device, comprising an display panel, wherein the display panel comprises an array substrate, wherein the array substrate comprises a plurality of data lines, a plurality of touch electrodes and a touch driving circuit; wherein the plurality of data lines are divided into a plurality of data line groups, each of the data line groups comprising a plurality of data lines arranged in sequence, and each of the data line groups corresponding respectively to one of the respective touch electrodes;

the touch driving circuit comprises a common signal line, a first switch unit and a second switch unit;

the first switch unit and the second switch unit are electrically connected with the touch electrodes;

the first switch unit is configured to electrically connect or disconnect the common signal line with or from the touch electrodes in response to a first control signal;

the second switch unit is controlled by a second control signal to electrically connect or disconnect the respective data line groups with or from the corresponding touch electrodes; and when the data line groups are electrically connected with the touch electrodes, at least one data line in each of the data line groups is provided with a touch detecting signal; and a color film substrate arranged opposite to the array substrate; and wherein the touch electrodes are first touch electrodes, the color film substrate are provided thereon with second touch electrodes, and extending directions of the second touch electrodes are the same as that of the first touch electrodes.

19. A display device, comprising a display panel, wherein the display panel comprises an array substrate, wherein the array substrate comprises a plurality of data lines, a plurality of touch electrodes and a touch driving circuit; wherein the plurality of data lines are divided into a plurality of data line groups, each of the data line groups comprising a plurality of data lines arranged in sequence, and each of the data line groups corresponding respectively to one of the respective touch electrodes;

the touch driving circuit comprises a common signal line, a first switch unit and a second switch unit;

the first switch unit and the second switch unit are electrically connected with the touch electrodes;

the first switch unit are electrically configured to connect or disconnect the common signal line with or from the touch electrodes in response to a first control signal;

the second switch unit is controlled by a second control signal to electrically connect or disconnect the respective data line groups with or from the corresponding touch electrodes; and when the data line groups are electrically connected with the touch electrodes, at least one data line in each of the data line groups is provided with a touch detecting signal; and a color film substrate arranged opposite to the array substrate; and wherein the touch electrodes are first touch electrodes, the color film substrate are provided thereon with second touch electrodes, and extending directions of the second touch electrodes are the same as that of the first touch electrodes, and wherein the extending directions of the first touch electrodes are the same as the extending directions of the data lines; and the extending directions of the second touch electrodes are perpendicular to the extending directions of the first touch electrodes.

* * * * *